US012636734B2

(12) United States Patent
Massey, Jr. et al.

(10) Patent No.: US 12,636,734 B2
(45) Date of Patent: May 26, 2026

(54) SYSTEMS AND METHODS TO CONFIGURE A ROBOTIC WELDING SYSTEM

(71) Applicant: Illinois Tool Works Inc., Glenview, IL (US)

(72) Inventors: Steven B. Massey, Jr., Appleton, WI (US); Kevin Gregory Pagano, Algonquin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/819,722

(22) Filed: Aug. 29, 2024

(65) Prior Publication Data

US 2025/0073823 A1      Mar. 6, 2025

Related U.S. Application Data

(60) Provisional application No. 63/579,675, filed on Aug. 30, 2023.

(51) Int. Cl.
| | |
|---|---|
| *B25J 9/00* | (2006.01) |
| *B23K 31/02* | (2006.01) |
| *B23K 37/02* | (2006.01) |
| *B25J 11/00* | (2006.01) |

(52) U.S. Cl.
CPC .......... *B23K 31/02* (2013.01); *B23K 37/0252* (2013.01); *B25J 9/0081* (2013.01); *B25J 11/005* (2013.01)

(58) Field of Classification Search
CPC .... B23K 31/02; B23K 37/0252; B25J 9/0081; B25J 11/005
See application file for complete search history.

(56) References Cited

U.S. PATENT DOCUMENTS

2023/0311321 A1* 10/2023 Bogart ................... B25J 9/1664

FOREIGN PATENT DOCUMENTS

CN          114043151          2/2022

OTHER PUBLICATIONS

Hammond, Maxwell, Robot independent programming system, https://iro.uiowa.edu/esploro/outputs/9984035794802771/filesAndLinks?institution=01IOWA_INST&index=null (2020) [University of Iowa] https://doi.org/10.17077/etd.005689 Downloaded on Feb. 27, 2023 17:39:08-0600.
Miller Electric Mfg. Co., "Welding Automation—DTPS (DeskTop Programming and Simulation)." 2013 (2 pages).

* cited by examiner

*Primary Examiner* — Lee A Holly
(74) *Attorney, Agent, or Firm* — McAndrews, Held & Malloy, Ltd.

(57) ABSTRACT

Disclosed example methods to generate a robotic welding program involve: generating a robotic welding program to weld a part using a collaborative robot welding system by manually manipulating the collaborative robot welding system to generate commands and robotic positioning information; automatically converting, using a processor, a first plurality of instructions of the robotic welding program for execution on the collaborative robot welding system to a second plurality of instructions to execute the robotic welding program on a non-collaborative type of robotic welding system; and performing the robotic welding program using the non-collaborative type of robotic welding system to weld the part using the second plurality of instructions.

14 Claims, 9 Drawing Sheets

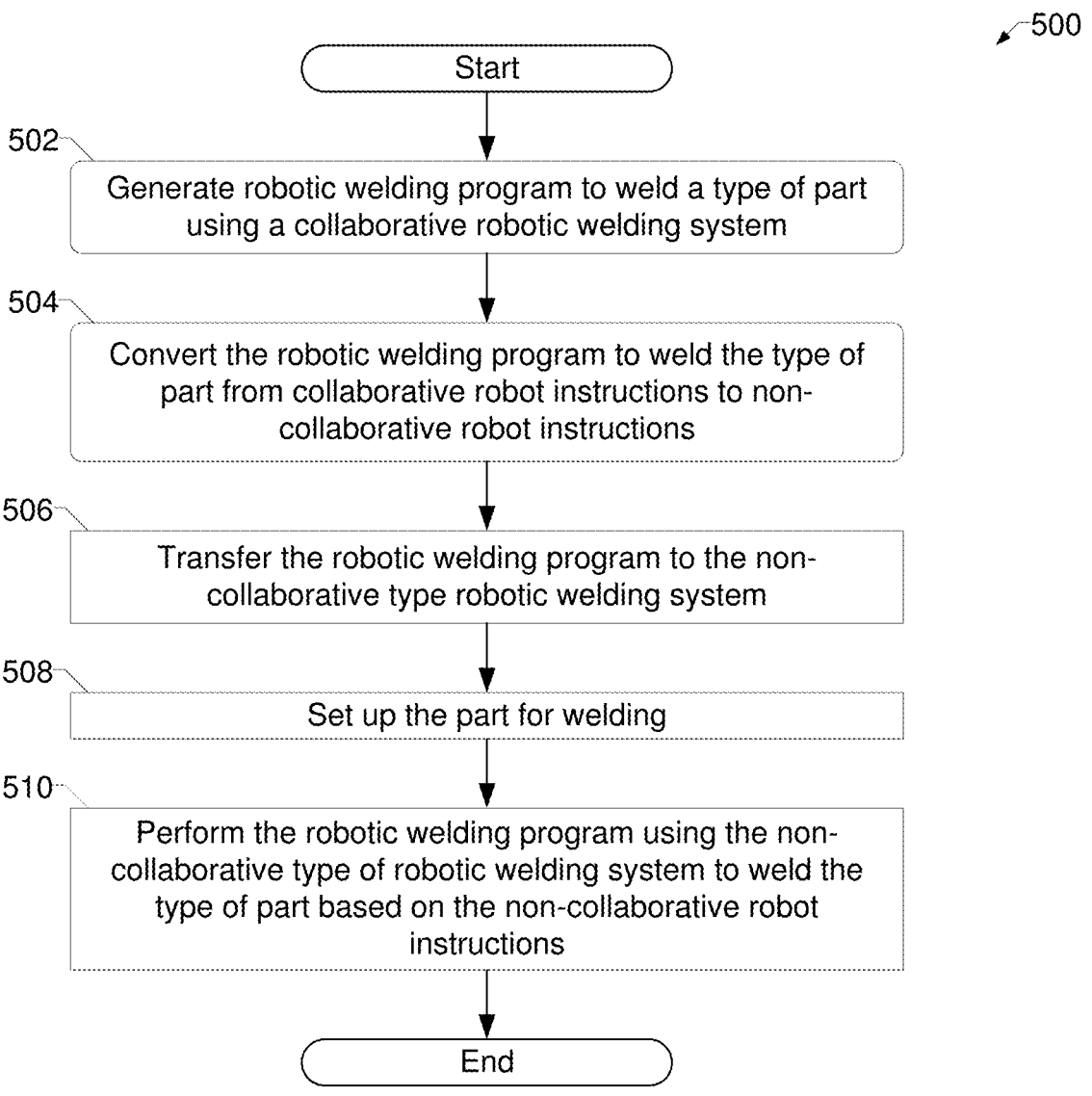

500

Start

502
Generate robotic welding program to weld a type of part using a collaborative robotic welding system 504
Convert the robotic welding program to weld the type of part from collaborative robot instructions to non-collaborative robot instructions 506
Transfer the robotic welding program to the non-collaborative type robotic welding system 508
Set up the part for welding 510
Perform the robotic welding program using the non-collaborative type of robotic welding system to weld the type of part based on the non-collaborative robot instructions

End

FIG. 5

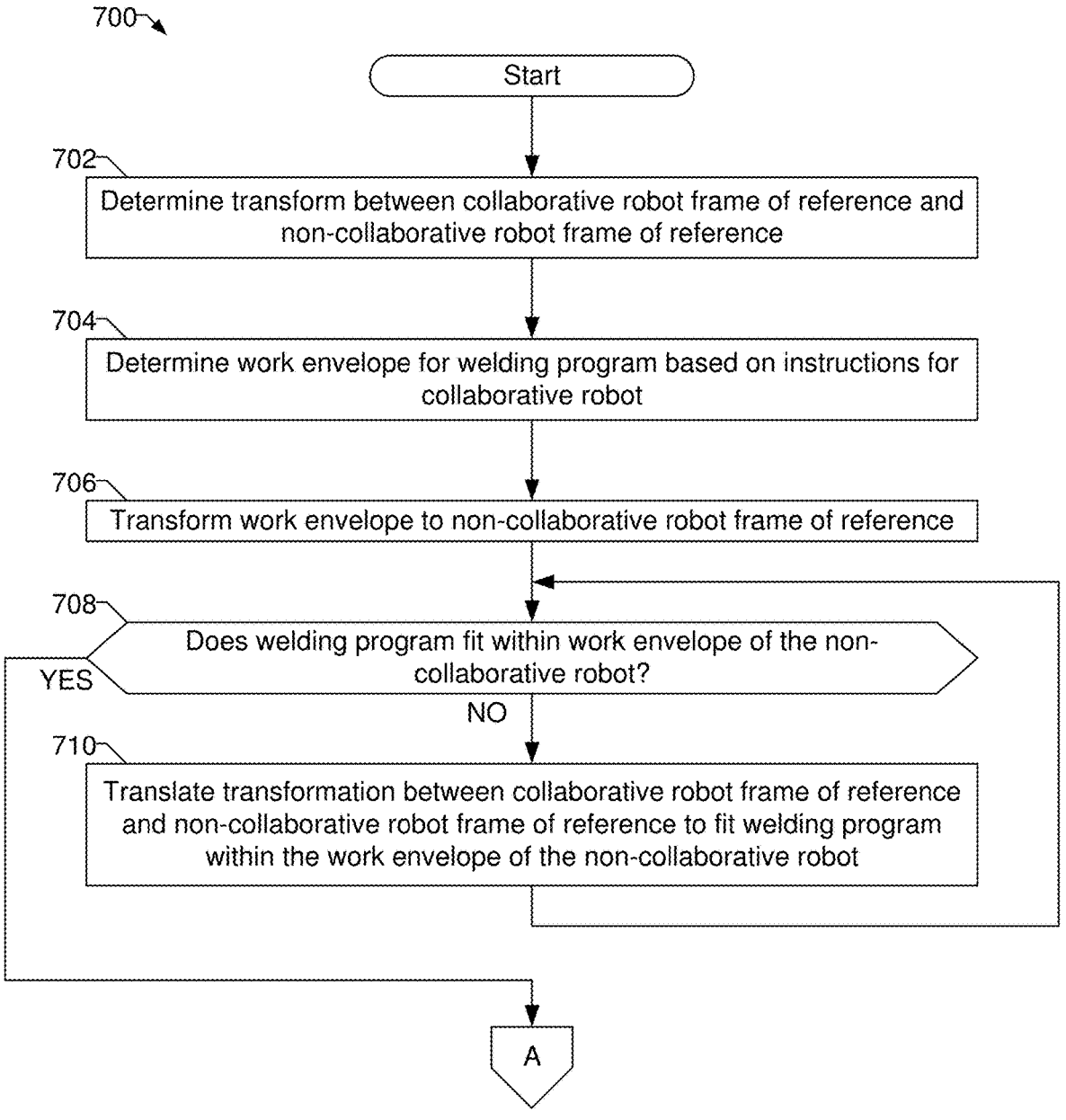

700

Start

702
Determine transform between collaborative robot frame of reference and non-collaborative robot frame of reference 704
Determine work envelope for welding program based on instructions for collaborative robot 706
Transform work envelope to non-collaborative robot frame of reference 708
Does welding program fit within work envelope of the non-collaborative robot?

YES

NO

710
Translate transformation between collaborative robot frame of reference and non-collaborative robot frame of reference to fit welding program within the work envelope of the non-collaborative robot

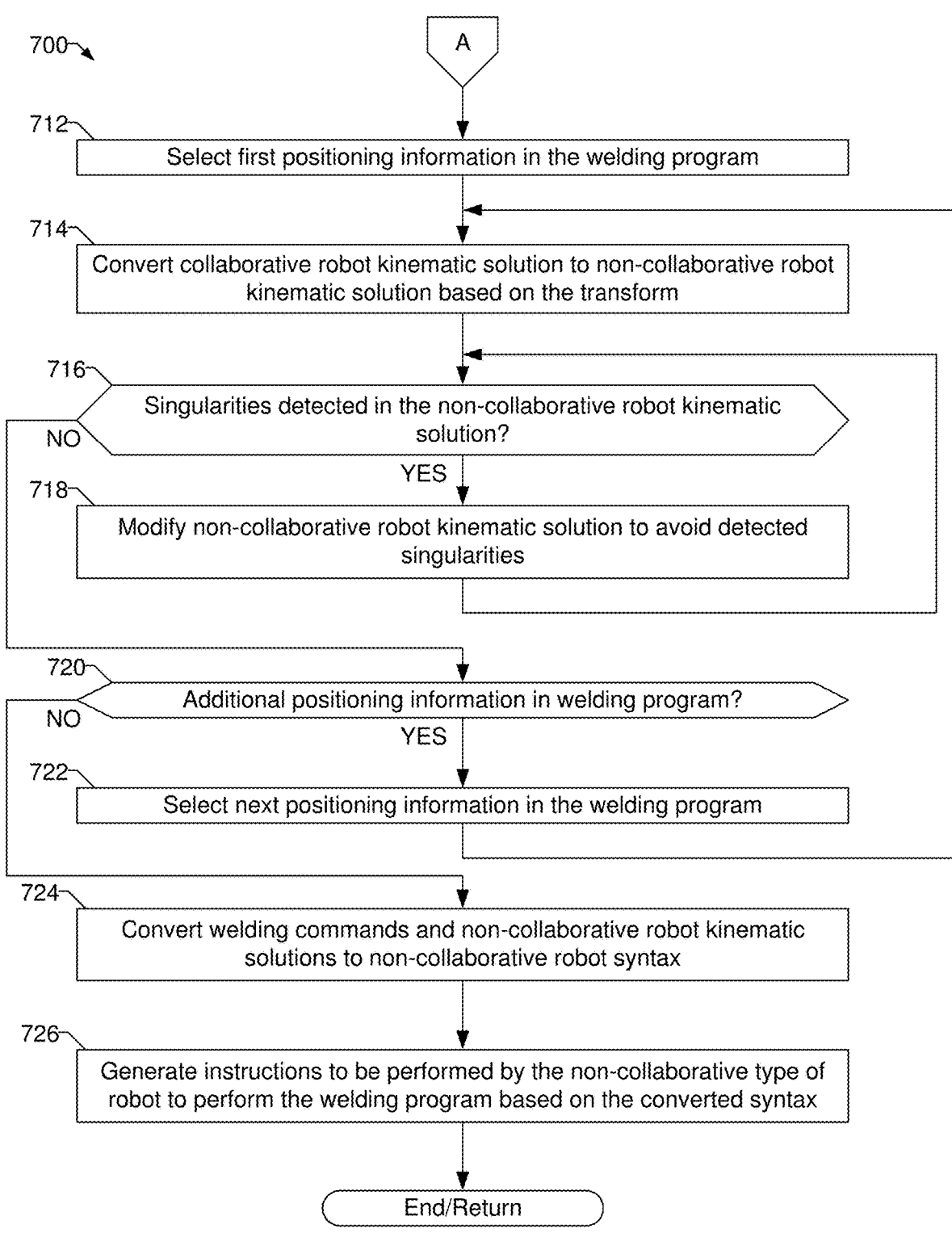

700

A

712 Select first positioning information in the welding program

714 Convert collaborative robot kinematic solution to non-collaborative robot kinematic solution based on the transform 716 Singularities detected in the non-collaborative robot kinematic solution?

NO

YES

718 Modify non-collaborative robot kinematic solution to avoid detected singularities 720 Additional positioning information in welding program?

NO

YES

722 Select next positioning information in the welding program

724 Convert welding commands and non-collaborative robot kinematic solutions to non-collaborative robot syntax 726 Generate instructions to be performed by the non-collaborative type of robot to perform the welding program based on the converted syntax End/Return

FIG. 7B

SYSTEMS AND METHODS TO CONFIGURE A ROBOTIC WELDING SYSTEM

RELATED APPLICATIONS

The present application claims the benefit of U.S. Provisional Patent Application Ser. No. 63/579,675, filed Aug. 30, 2023, entitled "SYSTEMS AND METHODS TO CONFIGURE A ROBOTIC WELDING SYSTEM." The entirety of U.S. Provisional Patent Application Ser. No. 63/579,675 is expressly incorporated herein by reference.

FIELD OF THE DISCLOSURE

This disclosure relates generally to robotic welding and, more particularly, to systems and methods to configure a robotic welding system.

BACKGROUND

Robotic welding is often used to perform repetitive welding operations involving workpieces having a consistent configuration and series of welds to be performed. However, programming robots to perform the welding can be a difficult, tedious, and error-prone task.

SUMMARY

Systems and methods to configure a robotic welding system are disclosed, substantially as illustrated by and described in connection with at least one of the figures, as set forth more completely in the claims.

BRIEF DESCRIPTION OF THE DRAWINGS

FIG. 5 is a flowchart representative of example machine readable instructions which may be executed by the example collaborative robot control system, the example non-collaborative robot control system, and/or the external computing system of FIG. 1 to convert a welding program from instructions for execution by a collaborative robotic welding system to instructions for execution by a non-collaborative type of robotic welding system.

FIGS. 7A and 7B illustrate a flowchart representative of example machine readable instructions which may be executed by the example collaborative robot control system, the example non-collaborative robot control system, and/or the external computing system of FIG. 1 to convert the robotic welding program to weld the type of part from collaborative robot instructions to non-collaborative robot instructions.

The figures are not necessarily to scale. Where appropriate, similar or identical reference numbers are used to refer to similar or identical components.

DETAILED DESCRIPTION

Figure 1:
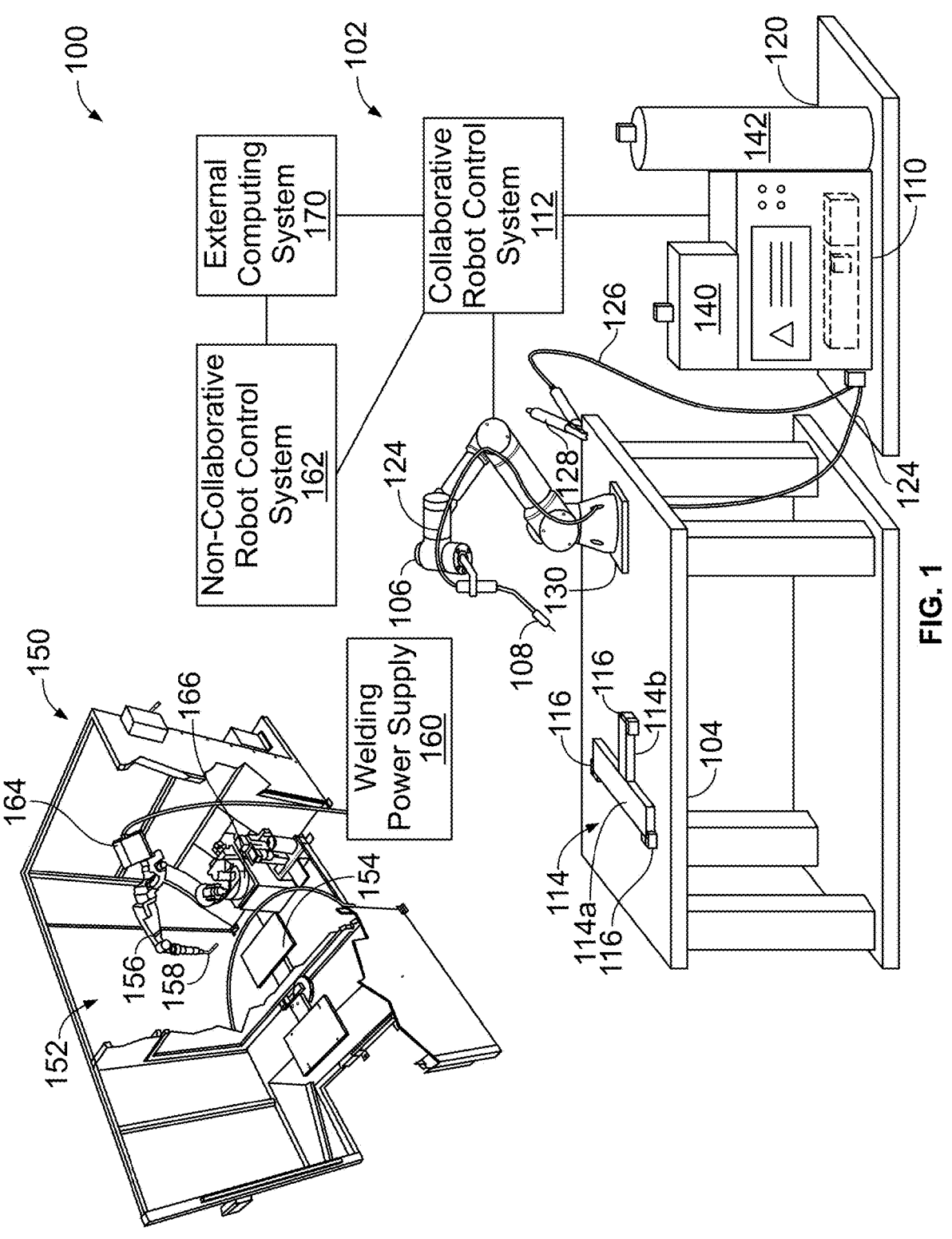
FIG. 1 illustrates an example robotic welding system to perform welding, including a welding-type power supply and a robot control system, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

The demand for skilled welders has been significantly higher than the supply of available welders in recent years. To partially alleviate this condition, both collaborative robots ("cobots") and industrial robots (non-collaborative robots) are becoming more widely used for welding. However, programming of industrial robots can require significant training and involve substantial time per welding program, such that the quantity of repetitive parts to justify generating a welding program on an industrial robot can be relatively high.

Disclosed systems and methods improve the productivity and reduce the overhead involved in using industrial welding robots by allowing weld programming performed using welding cobots to be transferred to an industrial robotic system. Industrial robots also have a higher productivity rate than cobot welding systems. Using disclosed systems and methods, one or more industrial robots can be used for production while the cobot is used as a teaching system, thereby reducing the production time that is lost for programming of the industrial robot. After creating a weld program on the cobot, the weld program is programmatically converted or translated from the language and/or conditions of the cobot to the language and/or conditions of the industrial robot.

In an example of operation, a welding fixture and part or assembly to be welded, is placed in front of the cobot welding system. The operator would then create the program using the cobot system. The program from the cobot is translated and transferred to the industrial robot using a translation system. The industrial robot then performs the translated welding program to weld the part or assembly.

As used herein, a "collaborative robot welding system" refers to a robotic welding system which is configured to be programmed or taught using lead-through teaching, in which an operator may physically grasp and manipulate the robot during programming. As used herein, a "non-collaborative robot welding system" refers to a robotic welding system which is not configured to be programmed or taught using lead-through teaching, such as robot welding systems which are programmed exclusively through the use of pendants, writing code, or other devices.

As used herein, the word "exemplary" means "serving as an example, instance, or illustration." The examples described herein are not limiting, but rather are exemplary only. It should be understood that the described examples are not necessarily to be construed as preferred or advantageous over other examples. Moreover, the terms "examples of the invention," "examples," or "invention" do not require that all examples of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

Disclosed example methods to generate a robotic welding program involve: generating a robotic welding program to weld a part using a collaborative robot welding system by manually manipulating the collaborative robot welding system to generate commands and robotic positioning information; automatically converting, using a processor, a first plurality of instructions of the robotic welding program for execution on the collaborative robot welding system to a second plurality of instructions to execute the robotic welding program on a non-collaborative type of robotic welding system; and performing the robotic welding program using the non-collaborative type of robotic welding system to weld the part using the second plurality of instructions.

In some example methods, the generating of the robotic welding program using the collaborative robot welding system involves using at least one of lead-through teaching or joystick-based teaching using a joystick positioned on a robotic manipulator of the collaborative robot welding system. In some example methods, the converting involves increasing a speed of execution of the robotic welding program from the collaborative robot welding system to the second type of robotic welding system.

In some example methods, the converting involves: executing a first program to convert the first plurality of instructions to an intermediate set of instructions; and executing a second program to convert the intermediate set of instructions to the second plurality of instructions. In some example methods, the converting involves modifying at least one of a frame of reference of the first plurality of instructions or a relative location of a fixture in the frame of reference. In some example methods, the modifying of the frame of reference or the relative location involves translating the frame of reference using at least three sets of teach points, each set of teach points including a first teach point in the frame of reference and a second corresponding teach point in a second frame of reference of the second type of robotic welding system.

In some example methods, the converting of the first plurality of instructions involves converting the robotic positioning information based on sizes of manipulator links of the collaborative robot welding system and sizes of manipulator links of the non-collaborative robot welding system. In some example methods, the first plurality of instructions includes a different programming syntax than the second plurality of instructions. In some example methods, the converting of the first plurality of instructions of the robotic welding program involves transferring the robotic welding program to an external computing system comprising the processor.

Some example methods further involve performing the robotic welding program on the second type of robotic welding system using the second plurality of instructions simultaneously with generating a second robotic welding program using the collaborative robot welding system. In some example methods, the converting of the first plurality of instructions involves: determining, with the processor, a working envelope of the non-collaborative robot; and determining, with the processor, whether the robotic welding program fits within the working envelope of the non-collaborative robot.

In some example methods, the converting involves converting a first kinematic solution for the collaborative robot welding system to perform movements represented in the robotic welding program to a second kinematic solution for the non-collaborative type of robotic welding system to perform the movements. In some example methods, the converting of the first kinematic solution to the second kinematic solution involves determining an equivalent kinematic solution to the first kinematic solution, based on a different set of manipulator joints and manipulator links on the non-collaborative type of robot than on the collaborative robot. In some example methods, the converting of the first kinematic solution to the second kinematic solution involves identifying singularities in the non-collaborative type of robotic welding system based on the first kinematic solution, and configuring the second kinematic solution based on the identified singularity.

Disclosed example robotic welding program conversion systems include: a processor; and a machine readable memory comprising machine readable instructions which, when executed by the processor, cause the processor to automatically convert a first plurality of instructions of a robotic welding program for execution on a collaborative robot welding system to a second plurality of instructions to execute the robotic welding program on a non-collaborative type of robotic welding system.

Disclosed example robotic welding systems include: a collaborative robotic welding system configured to generate a robotic welding program to weld a part using the collaborative robot welding system based on manual manipulation of the collaborative robot welding system to generate commands and robotic positioning information; a non-collaborative type of robotic welding system to weld the same part according to the robotic welding program; and a processing system configured to automatically convert a first plurality of instructions of the robotic welding program for execution on the collaborative robot welding system to a second plurality of instructions to execute the robotic welding program on the non-collaborative type of robotic welding system.

FIG. 1 illustrates an example robotic welding system 100 to generate welding programs. The example robotic welding system 100 of FIG. 1 includes a teaching system 102 including a welding table 104, a collaborative robotic manipulator 106 configured to manipulate a welding torch 108, a welding-type power supply 110, and a robot control system 112. The example teaching system 102 is usable by an operator to easily create welding programs for a particular part, at least in part by allowing the operator to perform lead-through teaching. As part of or in addition to creating a weld program, the teaching system 102 may also execute welding programs, with and/or without welding power provided to the welding torch.

The welding table 104, robotic manipulator 106, the welding torch 108, the welding-type power supply 110, and/or the robot control system 112, and/or subgroups of these components, may be packaged together (e.g., preassembled, pre-calibrated) to provide rapid setup of the robotic welding system 100 for welding at the end-user location. In the example of FIG. 1, the robotic manipulator 106 and/or the robot control system 112 are configured as a collaborative robot, which provides features that make the robotic manipulator 106 more conducive to working in areas in which people are proximate the robotic welding system 100.

In the example of FIG. 1, a workpiece 114 is positioned on the welding table 104. The workpiece 114 may include multiple components 114a, 114b which are to be welded together at one or more joints. To provide consistency in arrangement of the workpiece components 114a, 114b, the robotic welding system 100 may further include fixtures 116 attached to the welding table 104. The fixtures 116 may guide the placement of the components 114a, 114b, which can be used to consistently place the multiple components 114a, 114b.

During a welding operation or welding procedure (e.g., testing a generated welding program), the robotic welding system 100 manipulates the welding torch 108, such as the illustrated welding torch, to which power is delivered by the welding-type power supply 110 via a first conductor 124 and returned by way of a work cable 126 and a work clamp 128 coupled to the work table 104. The welding equipment may further include, for example, a source of shielding gas 142, a wire feeder 140, and other accessories and/or equipment. Other accessories and/or equipment may include, for example, water coolers, fume extraction devices, one or more controllers, sensors, user interfaces, and/or communication devices (wired and/or wireless).

The example robotic welding system 100 is configured to form a weld using any known electric welding techniques. Example electric welding techniques include shielded metal arc welding (SMAW), MIG, flux-cored arc welding (FCAW), TIG, laser welding, sub-arc welding (SAW), stud welding, friction stir welding, and resistance welding. In some examples, the welding-type power supply 110 and/or other welding equipment are configured to support one or more, but fewer than all, types of welding processes. To change welding processes, the welding-type power supply 110, torch 108, and/or other welding equipment may be removed (e.g., disconnected and moved away from the robotic welding system 100) and replaced by a different welding-type power supply, torch, and/or other welding equipment that supports the desired welding process. To facilitate ease of movement, the example welding equipment may be mounted or attached to a cart 120 or other conveyance (e.g., ground conveyance, hanging conveyance, etc.). Additionally or alternatively, multiple different types of welding equipment (e.g., multiple power supplies having different capabilities, multiple torches, etc.) may be co-located (e.g., proximate to a same robotic manipulator 106, on a rack of equipment, etc.) to enable rapid reconfiguration of the robotic welding system 100.

The example robotic manipulator 106 may operate using any number of degrees of freedom to manipulate the welding torch 108. For example, the robotic manipulator 106 may include multiple joints, in which each joint has one or more degrees of freedom, to achieve multiple orientations for accessing one or more weld joints on the workpiece 114. Whereas conventional welding robots are contained within a weld cell that is protected against intrusion by operators during robot operations (e.g., welding operations and/or other movement by the robot), in some examples the robotic welding system 100 is configured as a cobot, has a controller or processor, as well as one or more sensors, that are configured to operate in a manner such that humans do not necessarily need to be excluded from the area in which the robotic manipulator 106 is operating. For example, the robotic manipulator 106 may rapidly detect and respond to collisions, may operate with reduced speed and/or joint torque relative to conventional welding robots, and/or implement other features.

The robotic manipulator 106 is coupled to the table 104 via a base 130. Once secured, the base 130 is fixed with respect to the table 104, and may serve as a reference for position and/or orientation for the robotic manipulator 106.

The example robotic manipulator 106 and/or the example robot control system 112 are configured to transmit commands, requests, data, and/or other messages and/or communications to the power supply 110 via one or more protocols. The robotic manipulator 106 and/or the robot control system 112 are further configured to receive responses, acknowledgments, data, and/or other messages and/or communications from the power supply 110 via the one or more protocols. Based on a robotic welding procedure, the robotic manipulator 106 and/or the robot control system 112 may communicate parameters to the power supply 110 for configuration according to the robotic welding procedure, and/or adjust the welding-type process based on the variables and/or other data obtained from the power supply 110 while performing welding operations. In addition to communication with the power supply 110, the robotic manipulator 106, and/or the robot control system 112, the power supply 110, the robotic manipulator 106, and/or the robot control system 112 may communicate with other welding equipment (e.g., a welding accessory, such as the wire feeder 140) and/or other robotic equipment.

Example power source input parameters that may be transmitted by the robotic manipulator 106 and/or the robot control system 112 to the power supply 110 (e.g., directly, via a network, via a communications bus, etc.) include: a trigger command (e.g., to command the power supply 110 whether to output welding-type power and, when a wire-fed process is used, to command the power supply 110 or a separate wire feeder to feed wire); a purge command (e.g., to command the power supply 110 whether to output shielding gas); a jog command (e.g., to command the power supply 110 or a separate wire feeder whether to feed wire without outputting welding-type power); a schedule parameter (e.g., to select one of one or more previously defined sets of welding parameters); a wire speed parameter (e.g., to cause the power supply 110 or a wire feeder to control wire feeding to a specified rate); a voltage parameter (e.g., to cause the power supply 110 to output the welding-type power using a specified target voltage); an arc length parameter (e.g., to cause the power supply 110 to output the welding-type power based on a specified arc length); a current parameter (e.g., to cause the power supply 110 to output the welding-type power based on a specified target current); an electrode type parameter (e.g., to cause the power supply 110 to configure one or more welding parameters based on a specified electrode type); an electrode diameter parameter (e.g., to cause the power supply 110 to configure one or more welding parameters based on a specified electrode diameter); a gas type parameter (e.g., to cause the power supply 110 to configure one or more welding parameters based on a specified gas type); a material thickness parameter (e.g., to cause the power supply 110 to configure one or more welding parameters based on a specified material thickness of a workpiece); a process parameter (e.g., to cause the power supply 110 to output the welding-type power based on a specified welding-type process, such as pulse, short arc MIG, TIG, stick, etc.); a pulses per second parameter (e.g., to cause the power supply 110 to output the welding-type power based on a specified number of pulses per second in a pulse process); and/or an arc control parameter (e.g., to cause the power supply 110 to output the welding-type power based on a specified arc control, or simulated inductance, parameter). However, different welding-type power supplies may support or lack support for different combinations of these input parameters.

Example power source output parameters that may be transmitted by the power supply 110 the robotic manipulator 106 and/or the robot control system 112 (e.g., directly, via a network, via a communications bus, etc., asymmetrically and/or in response to a request) include: an output indicator (e.g., an indication of whether the power supply 110 is currently outputting welding-type current, an indication of whether the power supply 110 has an active welding-type output, etc.); a current detection indicator (e.g., an indication of whether a current output is currently detected by the power supply 110); a touch detection indicator (e.g., an indication of whether a short circuit is currently measured or detected by the power supply 110); a gas on indicator (e.g., an indication of whether the power supply 110 is currently outputting shielding gas and/or controlling a gas valve to output shielding gas); a ready indicator (e.g., an indication of whether the power supply 110 is in a state in which a welding-type operation could be performed, an indication of whether the power supply 110 is in an error or other state in which a welding-type operation could not be performed, an indication of whether the power supply 110 will respond to a trigger command, etc.); an error indicator (e.g., an indication of whether the power supply 110 is in an error state); a voltage feedback variable (e.g., a measured voltage feedback currently output by the power supply 110, such as the measured instantaneous voltage, the measured average voltage, the measured RMS voltage, etc.); a current feedback variable (e.g., a measured current feedback currently output by the power supply 110, such as the measured instantaneous current, the measured average current, the measured RMS current, etc.); a wire feed speed setpoint variable (e.g., a wire feed speed setpoint with which the power supply 110 or other wire feeder is currently configured); a voltage setpoint variable (e.g., a welding-type voltage setpoint with which the power supply 110 is currently configured, a control loop target voltage, etc.); a current setpoint variable (e.g., a welding-type current setpoint with which the power supply 110 is currently configured, a control loop target current, etc.); and/or an arc length setpoint variable (e.g., an arc length setpoint with which the power supply 110 is currently configured, a control loop arc length target, etc.). However, different welding-type power supplies may support or lack support for different combinations of these output parameters.

The example robotic welding system 100 further includes a production welding system 150, which performs automated welding operations within a weld cell 152 based on a welding program. The example production welding system 150 may be similar to the teaching system 102, in that the production welding system 150 includes a table 154 (or other welding positioner), a non-collaborative robotic manipulator 156, a welding torch 158, a power supply 160, a robot control system 162, weld and work connections, a wire feeder 164, and a source of shielding gas (where appropriate for the type of welding).

However, in contrast with the teaching system 102, the robotic manipulator 156 of the production welding system 150 is a non-collaborative type of robot. The robotic manipulator 156 may be a conventional robotic welding manipulator or a through-arm robotic welding manipulator.

In the production welding system 150, the example robotic manipulator 156 and/or the example robot control system 162 are configured to transmit commands, requests, data, and/or other messages and/or communications to the power supply 160 via one or more protocols. The robotic manipulator 156 and/or the robot control system 162 are further configured to receive responses, acknowledgments, data, and/or other messages and/or communications from the power supply 160 via the one or more protocols. Based on a robotic welding procedure, the robotic manipulator 156 and/or the robot control system 162 may communicate parameters to the power supply 160 for configuration according to a robotic welding procedure or program, and/or adjust the welding-type process based on the variables and/or other data obtained from the power supply 160 while performing welding operations. In addition to communication with the power supply 160, the robotic manipulator 156, and/or the robot control system 162, the power supply 160, the robotic manipulator 156, and/or the robot control system 162 may communicate with other welding equipment (e.g., a welding accessory, such as the wire feeder 164) and/or other robotic equipment.

Figure 2:
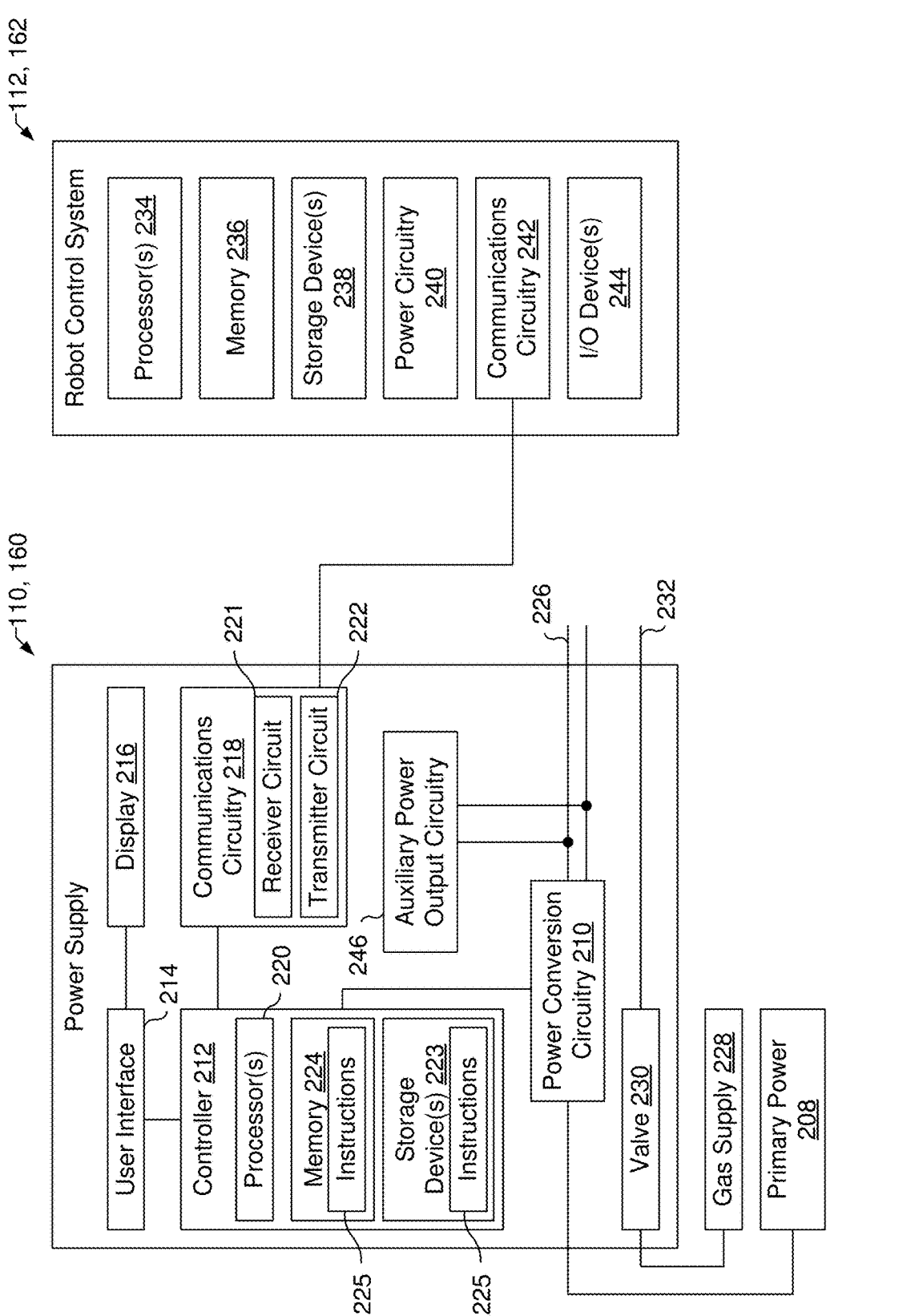
FIG. 2 is a block diagram of an example implementation of the welding-type power supply and the robot control system of FIG. 1.

FIG. 2 is a block diagram of an example implementation of the welding-type power supply 110 and the robot control system 112 of the teaching system 102 of FIG. 1. The power supply 160 and the non-collaborative robot control system 162 of FIG. 1 may also be implemented in a similar manner as described in FIG. 2. The illustrated example of FIG. 2 is disclosed below with reference to the welding-type power supply 110 and the robot control system 112.

The example welding-type power supply 110 powers, controls, and supplies consumables to a welding application. In some examples, the welding-type power supply 110 directly supplies input power to the welding torch 108. In the illustrated example, the welding-type power supply 110 is configured to supply power to welding operations and/or preheating operations. The example welding-type power supply 110 may also provide power to a wire feeder to supply electrode wire to the welding torch 108 for various welding applications (e.g., GMAW welding, flux core arc welding (FCAW)).

The welding-type power supply 110 receives primary power 208 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 208 may be supplied from an offsite location (e.g., the primary power may originate from the power grid). The welding-type power supply 110 includes a power conversion circuitry 210, which may include transformers, rectifiers, switches, and so forth, capable of converting the AC input power to AC and/or DC output power as dictated by the demands of the system (e.g., particular welding processes and regimes). The power conversion circuitry 210 converts input power (e.g., the primary power 208) to welding-type power based on a weld voltage setpoint and outputs the welding-type power via a weld circuit.

In some examples, the power conversion circuitry 210 is configured to convert the primary power 208 to both welding-type power and auxiliary power outputs. However, in other examples, the power conversion circuitry 210 is adapted to convert primary power only to a weld power output, and a separate auxiliary converter is provided to convert primary power to auxiliary power. In some other examples, the welding-type power supply 110 receives a converted auxiliary power output directly from a wall outlet. Any suitable power conversion system or mechanism may be employed by the welding-type power supply 110 to generate and supply both weld and auxiliary power.

The welding-type power supply 110 includes a controller 212 to control the operation of the welding-type power supply 110. The welding-type power supply 110 also includes a user interface 214. The controller 212 receives input from the user interface 214, through which a user may choose a process and/or input desired parameters (e.g., voltages, currents, particular pulsed or non-pulsed welding regimes, and so forth). The user interface 214 may receive inputs using any input device, such as via a keypad, keyboard, buttons, touch screen, voice activation system, wireless device, etc. Furthermore, the controller 212 controls operating parameters based on input by the user as well as based on other current operating parameters. Specifically, the user interface 214 may include a display 216 for presenting, showing, or indicating, information to an operator. The controller 212 may also include interface circuitry for communicating data to other devices in the system, such as the wire feeder, the robotic manipulator 106, and/or the robot control system 112. For example, in some situations, welding-type power supply 110 wirelessly communicates with other welding devices within the welding system. Further, in some situations, the welding-type power supply 110 communicates with other welding devices using a wired connection, such as by using a network interface controller (NIC) to communicate data via a network (e.g., ETHERNET, 10baseT, 10base100, etc.).

The controller 212 includes at least one controller or processor 220 that controls the operations of the welding-type power supply 110. The controller 212 receives and processes multiple inputs associated with the performance and demands of the system. The processor 220 may include one or more microprocessors, such as one or more "general-purpose" microprocessors, one or more special-purpose microprocessors and/or ASICS, and/or any other type of processing device. For example, the processor 220 may include one or more digital signal processors (DSPs).

The example controller 212 includes one or more storage device(s) 223 and one or more memory device(s) 224. The storage device(s) 223 (e.g., nonvolatile storage) may include ROM, flash memory, a hard drive, and/or any other suitable optical, magnetic, and/or solid-state storage medium, and/or a combination thereof. The storage device 223 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 224 may include a volatile memory, such as random access memory (RAM), and/or a nonvolatile memory, such as read-only memory (ROM). The memory device 224 and/or the storage device(s) 223 may store a variety of information and may be used for various purposes. For example, the memory device 224 and/or the storage device(s) 223 may store processor executable instructions 225 (e.g., firmware or software) for the processor 220 to execute. In addition, one or more control regimes for various welding processes, along with associated settings and parameters, may be stored in the storage device 223 and/or memory device 224, along with code configured to provide a specific output (e.g., initiate wire feed, enable gas flow, capture welding current data, detect short circuit parameters, determine amount of spatter) during operation.

In some examples, the welding power flows from the power conversion circuitry 210 through a weld cable 226. The example weld cable 226 is attachable and detachable from weld studs at each of the welding-type power supply 110 (e.g., to enable ease of replacement of the weld cable 226 in case of wear or damage). Furthermore, in some examples, welding data is provided with the weld cable 226 such that welding power and weld data are provided and transmitted together over the weld cable 226.

In some examples, the welding-type power supply 110 includes or is implemented in a wire feeder.

The example communications circuitry 218 includes a receiver circuit 221 and a transmitter circuit 222. Generally, the receiver circuit 221 receives data transmitted by the robotic manipulator 106 and/or the robot control system 112, and the transmitter circuit 222 transmits data to the robotic manipulator 106 and/or the robot control system 112.

In some examples, a gas supply 228 provides shielding gases, such as argon, helium, carbon dioxide, and so forth, depending upon the welding application. The shielding gas flows to a valve 230, which controls the flow of gas, and if desired, may be selected to allow for modulating or regulating the amount of gas supplied to a welding application. The valve 230 may be opened, closed, or otherwise operated by the controller 212 to enable, inhibit, or control gas flow (e.g., shielding gas) through the valve 230. Shielding gas exits the valve 230 and flows through a gas line 232 (which in some implementations may be packaged with the welding power output) to the wire feeder which provides the shielding gas to the welding application. In some examples, the welding-type power supply 110 does not include the gas supply 228, the valve 230, and/or the gas line 232.

The example robot control system 112 of FIG. 2 includes processor(s) 234, memory 236, one or more storage device(s) 238, power circuitry 240, communications circuitry 242, and one or more I/O device(s) 244.

The example processor(s) 234 execute instructions to configure and/or program a robotic welding procedure, and/or generates commands to execute a robotic welding procedure via the robotic manipulator 106. The processor(s) 234 may include one or more microprocessors, such as one or more "general-purpose" microprocessors, one or more special-purpose microprocessors and/or ASICS, and/or any other type of processing device. For example, the processor(s) 234 may include one or more digital signal processors (DSPs). The memory device 236 may include a volatile memory, such as random access memory (RAM), and/or a nonvolatile memory, such as read-only memory (ROM). The memory device 236 and/or the storage device(s) 238 may store a variety of information and may be used for various purposes. For example, the memory device 236 and/or the storage device(s) 238 may store processor executable instructions (e.g., firmware or software) for the processor(s) 234 to execute. In addition, one or more control regimes for various robotic manipulators and/or robotic welding procedures, along with associated settings and parameters, may be stored in the storage device(s) 238 and/or memory device 236. The storage device(s) 238 (e.g., nonvolatile storage) may include ROM, flash memory, a hard drive, and/or any other suitable optical, magnetic, and/or solid-state storage medium, and/or a combination thereof. The storage device(s) 238 store data (e.g., data corresponding to a welding application), instructions (e.g., software or firmware to perform welding processes), and/or any other appropriate data.

The power circuitry 240 converts input power to power usable by the robot control system 112 (e.g., by the processor(s) 234, the memory 236, the storage device(s) 238, communications circuitry 242, the I/O device(s) 244, and/or the robotic manipulator 106). In the illustrated example, the power supply 110 includes auxiliary power output circuitry 246, which converts input power (e.g., output power from the power conversion circuitry 210, primary power 208) to auxiliary power, such as a standard AC output (e.g., 120 VAC or 240 VAC at 50 Hz or 60 Hz). In some examples, the robot control system 112 may be plugged into welding-type power supply 110 to provide operational power to the robot control system 112 and/or the robotic manipulator 106. In such examples, the robot control system 112 can be plugged into the power supply 110 instead of mains power, and receives the auxiliary power via an auxiliary power connection (e.g., auxiliary power conductors such as an AC power cord).

The example communications circuitry 218 and the communications circuitry 242 of FIG. 2 are configured to communicate via a hard wired connection 248. In examples in which the communications circuitry 218 and the communications circuitry 242 communicate via auxiliary power conductors, the communications circuitry 218 and the communications circuitry 242 may be configured to comply with the IEEE Standard 1901-2010 and/or any other power line communication standard or technique compatible with high-speed communication over the auxiliary power connection.

The I/O device(s) 244 may include operator or user interfaces and/or other data interfaces. Example I/O device(s) 244 may include a keyboard, a keypad, a mouse, a trackball, a pointing device, a microphone, an audio speaker, a display device, an optical media drive, a multi-touch touch screen, a gesture recognition interface, a magnetic media drive, and/or any other operator interface devices to enable an operator to view information about the robot control system 112, the robotic manipulator 106, a robotic welding procedure, the connected power supply 110 and/or any other connected welding equipment, and/or any other information. For example, the I/O device(s) 244 may include input and/or output device(s) to control movement of the robotic manipulator 106. In other examples, the communications circuitry 242 may also include a communication interface to communicate with and control the robotic manipulator 106.

Upon establishing communication between the robot control system 112 and the power supply 110, the power supply 110 may transmit to the robot control system 112 information that can be used to configure the power supply 110. The robot control system 112 can then provide commands to the power supply 110 to configure the power supply 110 to perform the desired welding processes as part of a robotic welding procedure.

Example information that may be automatically transmitted to the robot control system 112 by the power supply 110 may include an: identifier of a paired welding-type power supply (e.g., a serial number, an assigned name, etc.), an identification of capabilities of a paired welding-type power supply (e.g., a listing of features and/or modifiable parameters, a model number, etc.), software instructions to facilitate control of the welding-type power supply 110 by the robot control system 112 (e.g., a software application or plug-in, software updates, software routines, an API, etc.), identification of a welding capability of the welding-type power supply (e.g., a listing of available welding processes), identification of an adjustable parameter of the welding-type power supply (e.g., parameters that are typically used by an operator, parameters that are modifiable by typically hidden from the operator, robotic welding-specific parameters, etc.) identification of a parameter limitation of the welding-type power supply (e.g., voltage limits, current limits, power limits, wire feed speed limits, frequency limits, etc.), a robotic welding procedure and/or welding-type parameters to perform the robotic welding procedure (e.g., a stored, predefined set of instructions to be implemented by the robot control system 112 to perform a robotic welding procedure), and/or any other information that may be transferred between the power supply 110 and the robot control system 112. Additionally or alternatively, the welding-type power supply 110 may transmit one or more available real-time process data streams, such as welding current measurements, output voltage measurements, wire feed speed measurements. The robot control system 112 may use real-time process data streams for other aspects of the robotic welding procedure, such as process control, seam tracking, and/or any other control.

Additionally or alternatively, the welding-type power supply 110 may transmit information about physical system needs, such as the need for physical isolation or other physical configuration to be performed by the operator, to the robot control system 112. Based on the physical configuration information, the robot control system 112 may display the physical information to an operator via a display or otherwise notify the operator of the physical requirements. Additionally or alternatively, the welding-type power supply 110 may transmit system status information about one or more components of the welding system, for display by the robot control system 112 or other action. Example welding equipment system status information may include internal temperature measurements, airflow measurements, coolant circulation information, error codes and/or other diagnostic information, and/or any other status information.

In some examples, the welding-type power supply 110 and/or the robot control system 112 may store information about the most recent system to which the power supply 110 or the robot control system 112 was pairing or connected. This information can then be used to quickly configure a subsequent robot control system to which the power supply 110 is paired or connected, or a subsequent power supply to which the robot control system 112 is paired or connected. For example, an operator may wish to move a power supply 110 from robot station to robot station within a fabrication shop, and have the applicable robot configuration parameters be applied to each robot that is connected or paired to the power supply 110. When the power supply 110 is paired or connected to each subsequent robot control system, the power supply 110 may automatically, or in response to operator input, transmit the robot configuration information to the robot control system to quickly configure the robot control system to perform robotic welding procedures.

In some examples, the welding-type power supply 110 and/or the robot control system 112 automatically update stored robotic welding procedures when changes are made to a stored robotic welding procedure that is imported for use. Additionally or alternatively, the welding-type power supply 110 and/or the robot control system 112 may maintain and store update histories of robotic welding procedures and/or parameters. When an operator makes a change to a robotic welding procedure stored on a power supply 110 (or robot control system 112), and then pairs the power supply 110 (or robot control system 112) to a different robot control system (or different power supply), the previous changes to the robotic welding procedure are automatically recognized and applied, and/or are easily applied and/or easily reverted via a user interface.

Figure 3:
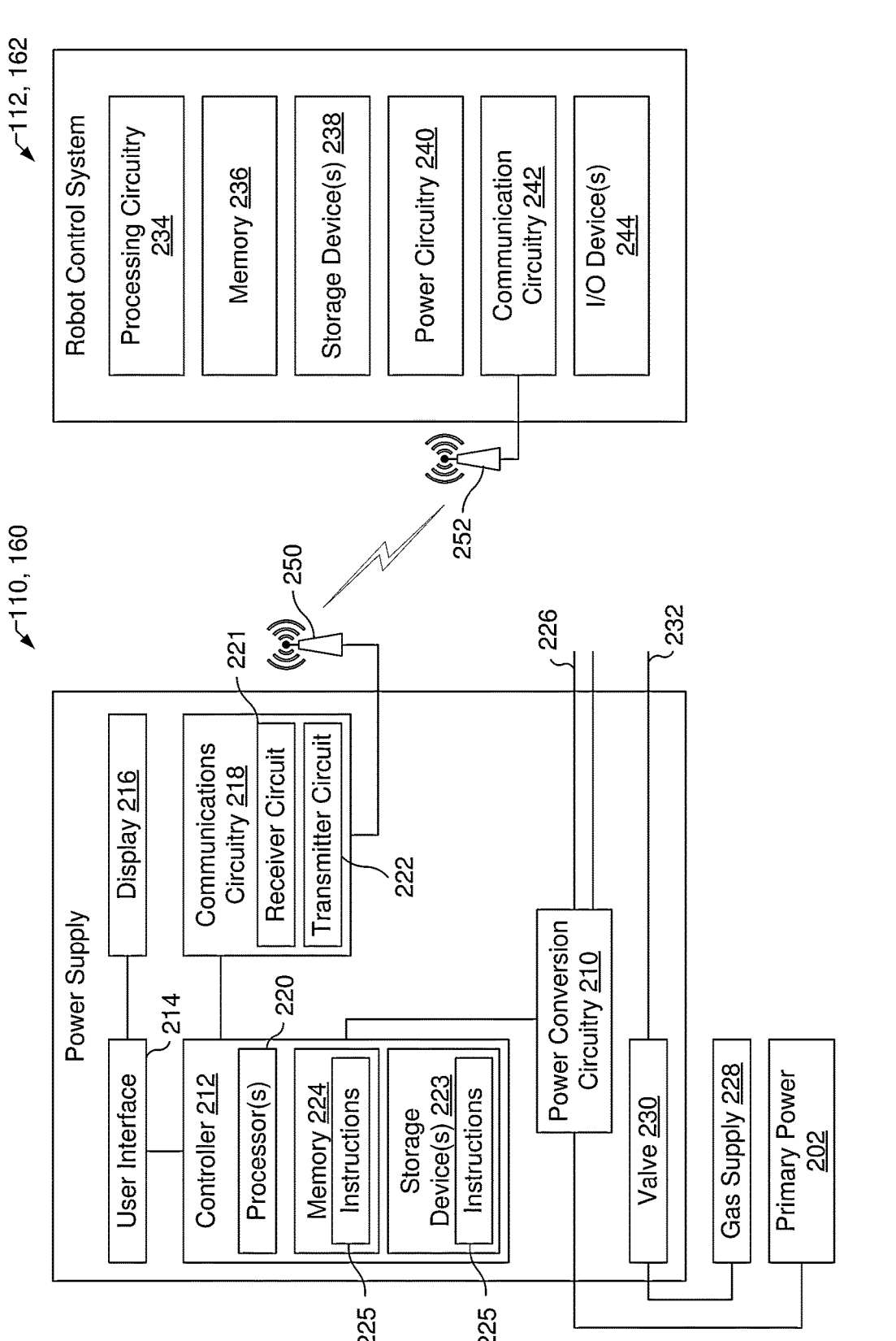
FIG. 3 is a block diagram of another example implementation of the welding-type power supply and the robot control system of FIG. 1.

FIG. 3 is a block diagram of another example implementation of the welding-type power supply 110 and the robot control system 112 of FIG. 1. The power supply 160 and the non-collaborative robot control system 162 of FIG. 1 may also be implemented in a similar manner as described in FIG. 2. The illustrated example of FIG. 2 is disclosed below with reference to the welding-type power supply 110 and the robot control system 112.

The example power supply 110 of FIG. 3 includes the components of the example power supply 110 of FIG. 2, but may include or omit the auxiliary power output circuitry 246. The example robot control system 112 of FIG. 3 includes the components of the robot control system 112 of FIG. 2.

In contrast with the power line communication of FIG. 2, the example welding-type power supply 110 and the robot control system 112 of FIG. 3 communicate via wireless communications. To this end, the example communications circuitry 218 and communications circuitry 242 are connected to respective antennas 250, 252.

While establishment of communications may occur automatically using power line communications as in FIG. 2, the example robot control system 112 and/or the power supply 110 may require initiation of pairing by the operator (e.g., via the user interface 214 and the I/O device(s) 244) to establish communication between the robot control system 112 and/or the power supply 110. For example, the operator may select a "Pair" button on each of the user interface 214 of the power supply 110 and a user interface of the robot control system 112, which then causes the communications circuitry 218 and the communications circuitry 242 to perform a pairing procedure. Upon establishing the communications channel via pairing, the power supply 110 and the robot control system 112 automatically exchange information and/or configure the power supply 110 as discussed above. In some examples, the operator may further be prompted to verify the pairing occurred between the desired power supply 110 and robot control system 112 (e.g., neither the power supply 110 nor the robot control system 112 paired with an unintended device nearby).

Returning to FIG. 1, non-collaborative types of robots (e.g., high-speed or industrial types of robots) are not designed to be operated in proximity of personnel. Use of non-collaborative types of robots typically involves the use of guarding to exclude personnel from the area reachable by the non-collaborative robotic manipulator, sensors to detect conditions in which the non-collaborative robot should be prevented from being actuated, and/or other techniques to avoid operation when a person is or is potentially within a distance which is contactable by the robotic manipulator and/or where a person may be subject to exposure to a welding arc. As a result, teaching or programming welds on non-collaborative types of robots involves the use of a teach pendant or other remote computing device, which is conventionally slower than teaching using techniques available on collaborative robots. Such teaching may involve either taking a production robot offline to perform teaching, and/or having a separate robot dedicated to teaching, which can take away from production resources.

However, non-collaborative types of robots may be capable of higher movement speeds than the (e.g., due to the constituent components and/or the code controlling the robotic manipulator 156). Additionally or alternatively, non-collaborative types of robots may be staged simultaneously with production by using a first table to perform welding while an operator loads or stages a table with a second workpiece. The first table and second table can then be quickly swapped to reduce or minimize time between welds. In view of these advantages, non-collaborative types of robots can be more productive than collaborative robots after the welding program has been established.

To improve the speed of teaching welding programs to be performed, and thereby further improve the productivity of non-collaborative robots, the example teaching system 102 allows for generating a robotic welding program to weld a type of part using the teaching system 102 by manually manipulating the collaborative robotic manipulator 106 to generate commands and robotic positioning information, and automatically converting the generated robotic welding program for execution on non-collaborative welding systems such as the production welding system 150. The generation of the welding program using the teaching system 102 may involve using lead-through teaching, stylus-based teaching, joystick-based teaching (e.g., using a joystick positioned on the collaborative robotic manipulator 106), pendant-based teaching, and/or any other type or combination of types of teaching welding program points and/or commands.

Conversion of the welding program involves converting first instructions which are executable on the teaching system 102 (e.g., on the robot control system 112 and/or the robotic manipulator 106) to second instructions which are executable by the production welding system 150 (e.g., on the robot control system 162 and/or the robotic manipulator 156). The conversion may be performed by the robot control system 112, the robot control system 162, and/or by one or more external computing device(s) 170. The external computing device(s) 170 may be in communication with either or both of the robot control system 112 and/or the robot control system 162 over a network. In other examples, data may be transferred to and/or from the external computing device(s) 170 via storage devices.

Figure 4:
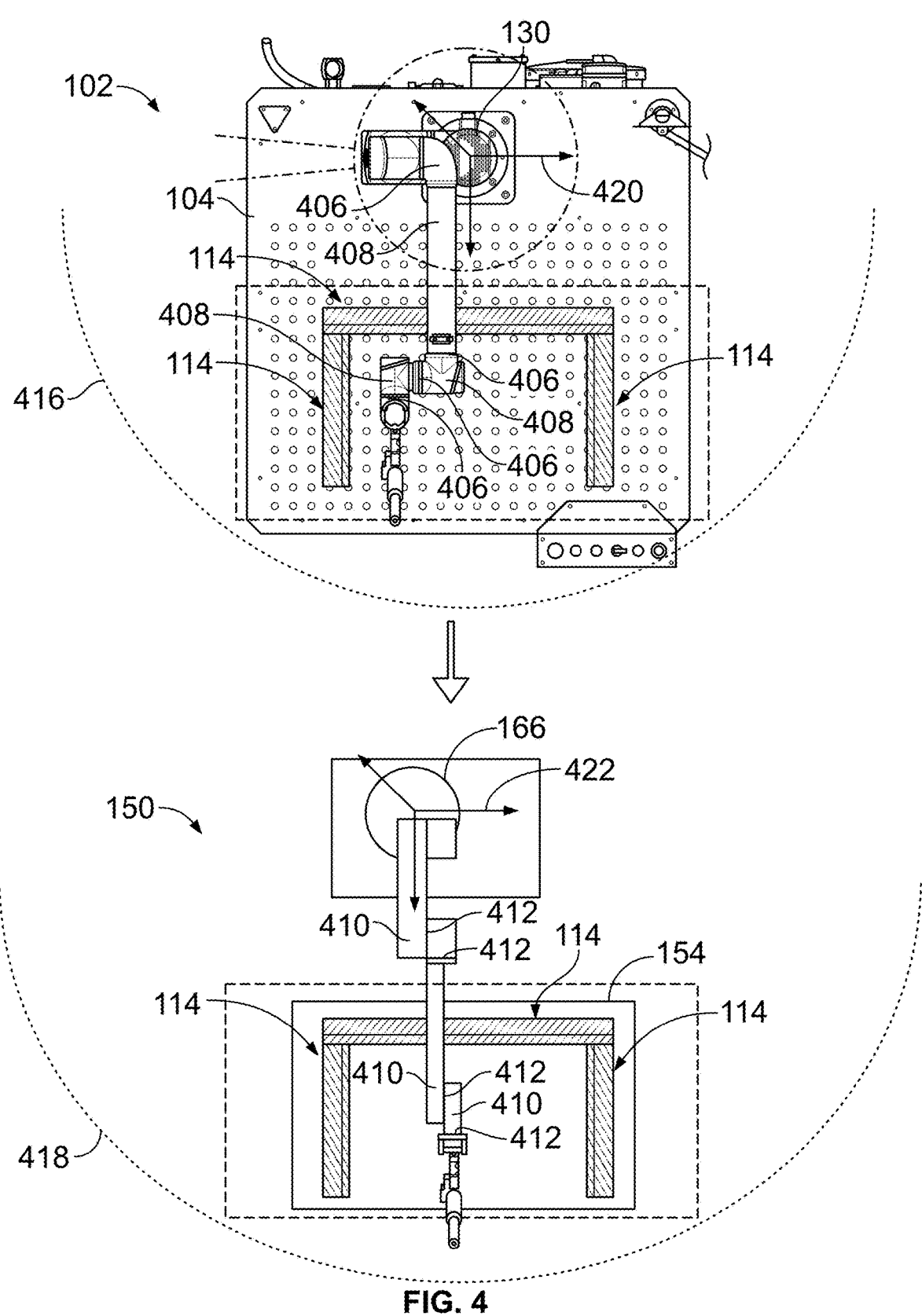
FIG. 4 illustrates example elements of a conversion of a welding program from instructions for execution by a collaborative robotic welding system to instructions for execution by a non-collaborative type of robotic welding system.

The production welding system 150 may have a programming syntax, working envelope, and/or other design elements which are different than those of the teaching system 102. For example, the manipulator joint configurations and/or manipulator link lengths of the robotic manipulator 156 may be different than the manipulator joint configurations and/or manipulator link lengths of the robotic manipulator 106. FIG. 4 illustrates example elements of a conversion of a welding program from first instructions for execution by a collaborative robotic welding system (e.g., the teaching system 102) to second instructions for execution by a non-collaborative type of robotic welding system (e.g., the production welding system 150).

The conversion of the instructions may occur on an individual instruction level and/or converting groups of instructions. For example, one instruction for the collaborative robotic welding system may involve multiple instructions at the non-collaborative type of robotic welding system to perform an equivalent action. Conversely, a set of multiple instructions for the collaborative robotic welding system may be implemented using a single instruction at the non-collaborative type of robotic welding system to perform an equivalent action.

In some examples, the conversion (e.g., by the robot control system 112, the robot control system 162, and/or the external computing device(s) 170) further involves converting the first instructions to intermediate instructions in an intermediate language or syntax, and then converting the intermediate instructions to the second instructions. For example, the intermediate instructions may be a generic robot (e.g., robot-agnostic) programming language or syntax, a generic set of reference coordinates, and/or generic communications and/or commands with a welding system, from which one or more conversions to other types of languages and/or robots can be performed.

The positioning information conversion may be based on sizes of manipulator links 406 and/or types and positioning of manipulator joints 408 of the teaching system 102 (e.g., the collaborative robotic manipulator 106) and sizes of manipulator links 410 and/or types and positioning of manipulator joints 412 of the production welding system 150 (e.g., the non-collaborative robotic manipulator 156). For example, the links 406 and joints 408 of the robotic manipulator 106 may be different than the links 410 and joints 412 of the robotic manipulator 106, which can create the opportunities for singularities and/or other problematic movements (and/or efficiencies or other improvements) when converting from a first set of kinematic solutions used by the teaching system 102 (e.g., the robotic manipulator 106) to a second set of kinematic solutions used by the production welding system 150 (e.g., the robotic manipulator 156).

In the example teaching system 102, the robotic manipulator 106 is attached directly to the welding table 104. In contrast, the table 154 of the example production welding system 150 has a predetermined position with respect to the robotic manipulator 156. For example, a base 166 of the robotic manipulator 156 may be fixed at least during welding operations. The non-collaborative robot control system 162 determines the position of the table 154 with respect to the base 166 (or other reference point on the robotic manipulator 156), such as using position sensors.

Each of the teaching system 102 (e.g., the robotic manipulator 106) and the production welding system 150 (e.g., the robotic manipulator 156) has a predetermined working envelope 416, 418, and a frame of reference 420, 422. The working envelope refers to a positioning limit of the robotic manipulators 106, 156, and the frame of reference provides a directional and positioning reference from which the robotic welding system can specify positioning and/or orientation information. For example, the frame of reference may be defined by a set of vectors referenced from a predetermined point on the base 130, 166, or any other reference point(s) and/or directions.

The predetermined working envelope 416, 418 and/or the frame of reference 420, 422 of each of the teaching system 102 and the production welding system 150 are based on the location of the respective bases 130, 166. The predetermined working envelope 416, 418 is further based on the configurations of the manipulator links 406, 410 and manipulator joints 408, 412. To convert between the working envelopes 416, 418 of the teaching system 102 and the production welding system 150, the conversion may also involve converting positioning information from one frame of reference 420 and/or working envelope 416 to another frame of reference 422 and/or working envelope 418. The conversion may involve determining whether the positions and/or orientations (e.g., as determined by appropriate kinematic solutions) in the weld program, after translation from the first frame of reference 420 to the second frame of reference 422, fit within or exceed the limits of the working envelope 418 of the production welding system 150.

Additionally or alternatively, the conversion may involve determining a working envelope of the welding program. For example, a working envelope 424 may be determined based on the extremities of the set of positions for the collaborative robotic welding system to perform the welds. The working envelope 424 of the welding program may then be compared to the working envelope 418 of the non-collaborative robotic welding system to verify that the welding program can be accomplished.

In some other examples, the frames of reference 420, 422 may be defined using a set of three or more points (or vectors) which are mapped between the teaching system 102 and the production welding system 150. For example, three or more sets of corresponding reference points may be defined for each of the teaching system 102 and the production welding system 150. The conversion may include referencing position information of the robotic welding program to the reference points, from which the kinematic solutions can be calculated.

The robot control system 112, the robot control system 162, and/or the external computing device(s) 170 may convert and/or determine the kinematic solutions for the non-collaborative robotic welding system based on the positioning information within the welding program. For example, the kinematic solutions and/or identifications of singularities may be different for the non-collaborative robotic welding system than on the collaborative robotic welding system due to differences between the joints on the different robotic manipulators 106, 156 (e.g., in-line joints vs. offset joints) and/or differences between locations of the reference points and the bases 130, 166.

After conversion, the production welding system 150 may then perform the robotic welding program generated on the teaching system 102, as converted. The teaching system 102 may support and generate welding programs for multiple non-collaborative robot welding systems and/or multiple different types of non-collaborative robot welding systems by performing the appropriate conversions. Additionally or alternatively, while the teaching system 102 is not being used for teaching weld programs, the teaching system 102 may be used for production of parts, thereby further increasing productivity of a manufacturing facility.

FIG. 5 is a flowchart representative of example method 500 which may be performed by the example collaborative robot control system 112, the example non-collaborative robot control system 162, and/or the external computing system 170 of FIG. 1 to convert a welding program from instructions for execution by a collaborative robotic welding system (e.g., the teaching system 102) to instructions for execution by a non-collaborative type of robotic welding system (e.g., the production welding system 150).

At block 502, the robot control system 112 of the teaching system 102 generates a robotic welding program to weld a type of part using a collaborative robot. The teaching may involve, for example, lead-through teaching, stylus-based teaching, joystick-based teaching, pendant-based teaching, and/or any other type or combination of types of teaching welding program points and/or commands. The robot control system 112 stores location information, commands, and/or any other instructions based on the teach points as set by an operator. Example instructions that may be used to perform block 502 are disclosed below with reference to FIG. 6.

At block 504, the robot control system 112, the robot control system 162, and/or the external computing device 170 convert the robotic welding program to weld the type of part from collaborative robot instructions to non-collaborative robot instructions. The conversion may involve converting individual instructions and/or groups of instructions, involving location information, kinematic solutions, welding power supply commands, and/or other robotic welding program instructions. Example instructions that may be used to perform block 504 are disclosed below with reference to FIGS. 7A and 7B.

At block 506, the robotic welding program is transferred to the non-collaborative type of robotic welding system. For example, the converted robotic welding program may be transferred via a network or via a storage device.

At block 508, the type of part is set up for welding (e.g., by an operator on the table 154). At block 510, the non-collaborative robotic welding system performs the robotic welding program to weld the type of part using the non-collaborative robot instructions. Blocks 508 and 510 may be repeated for multiple parts, while the collaborative robot may simultaneously be used to teach additional weld programs or other purposes.

The example method 500 then ends.

Figure 6:
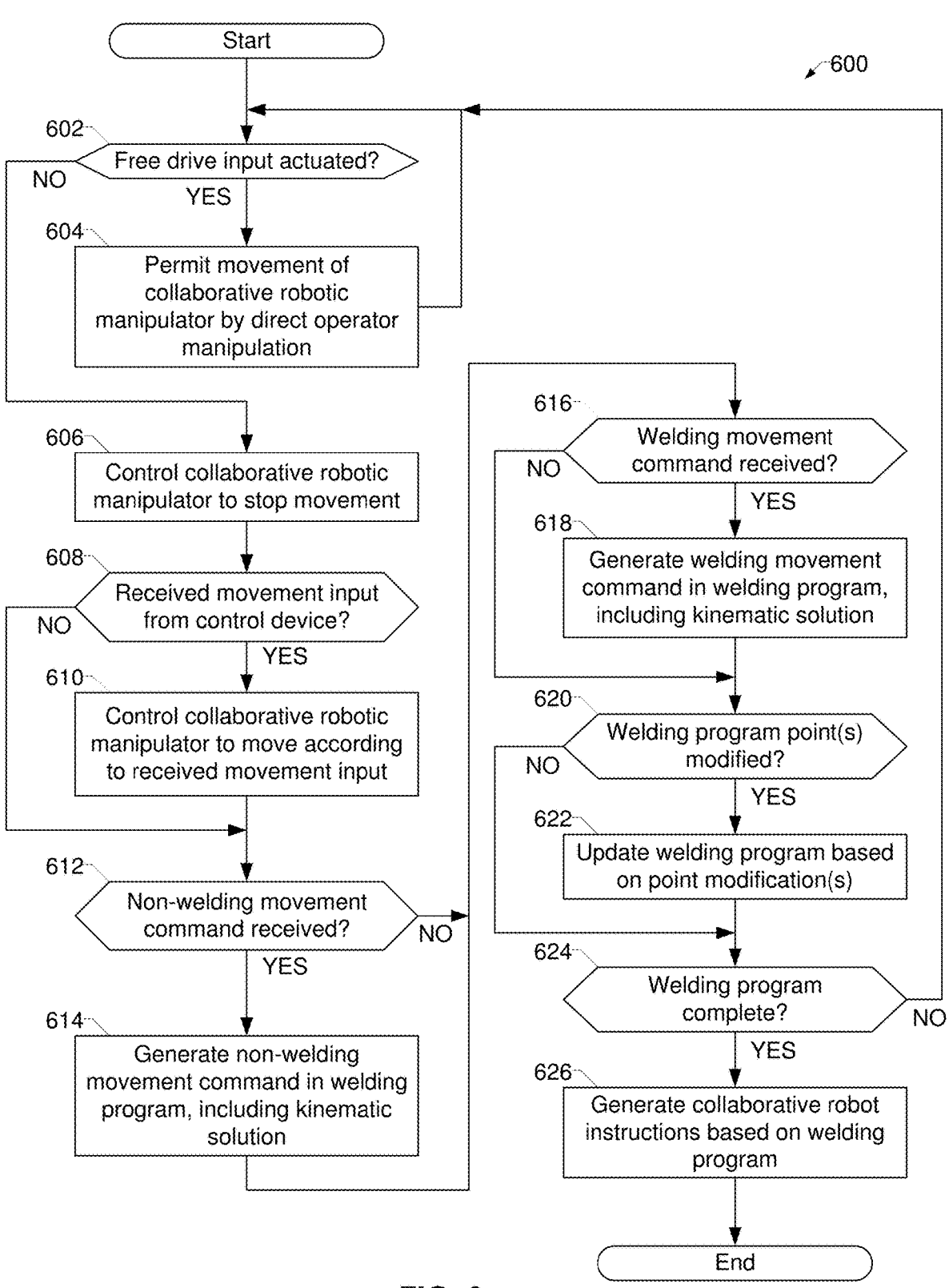
FIG. 6 is a flowchart representative of example machine readable instructions which may be executed by the example collaborative robot control system to generate a robotic welding program using a collaborative robotic welding system.

FIG. 6 is a flowchart representative of example machine readable instructions 600 which may be executed by the example collaborative robot control system (e.g., the teaching system 102) to generate a robotic welding program. The example instructions 600 may be performed to implement block 502 of FIG. 5.

At block 602, the collaborative robot control system 112 determines whether a free drive input is actuated. For example, the operator may actuate a switch to place the robotic manipulator 106 into a free drive mode, in which the operator can physically manipulate the position and orientation of the robotic manipulator. If the free drive input is actuated (block 602), at block 604 the collaborative robot control system 112 permits movement of the collaborative robotic manipulator 106 by direct operator manipulation. For example, the collaborative robot control system 112 may control the robotic manipulator 106 to apply sufficient force to overcome gravitational forces, but to otherwise allow the operator to manipulate the robotic manipulator 106. Control then returns to block 602.

If the free drive input is not actuated (block 602), at block 606 the collaborative robot control system 112 controls the collaborative robotic manipulator 106 to stop movement (e.g., to lock). For example, the collaborative robot control system 112 may control the robotic manipulator 106 to apply sufficient force to substantially prevent physical manipulation by the operator.

At block 608, the collaborative robot control system 112 determines whether a movement input has been received from a control device. Example control devices may include a joystick, a stylus, a pendant, and/or any other type of motion control input device. If a movement input has been received from a control device (block 608), at block 610 the collaborative robot control system 112 controls the collaborative robotic manipulator 106 to move according to the received movement input. Control then returns to block 608.

If a movement input has not been received from a control device (block 608), at block 612 the collaborative robot control system 112 determines whether a non-welding movement command has been received. An example non-welding movement command may be a non-welding jog movement (e.g., moving to the start of a weld, moving between welds, etc.) or a command to end a welding movement. If a non-welding movement command has been received (block 612), at block 614 the collaborative robot control system 112 generates a non-welding movement command in the welding program, including a kinematic solution to implement the movement command. For example, the collaborative robot control system 112 may calculate and store instructions for joint actuators to implement the movement command.

If a non-welding movement command has not been received (block 612), or after generating a non-welding movement command (block 614), at block 616 the collaborative robot control system 112 determines whether a welding movement command has been received. Example welding movement commands may include starting a weld at a particular location and/or for specifying a position of an ongoing weld (e.g., for curvature calculation, for changing linear directions, etc.). If a welding movement command has been received (block 616), at block 618 the collaborative robot control system 112 generates a welding movement command in the welding program, including a kinematic solution to implement the movement command.

If a welding movement command has not been received (block 616), or after generating a welding movement command (block 618), at block 620 the collaborative robot control system 112 determines whether any welding program point(s) have been modified. For example, the collaborative robot control system 112 may determine whether the operator has marked a movement point near a previously existing movement point and/or modified the program point(s) via a pendant or other control device. If welding program point(s) have been modified (block 620), at block 622 the collaborative robot control system 112 update the welding program based on the point modification(s).

If welding program point(s) have not been modified (block 620), or after updating the welding program based on the point modification(s) (block 622), at block 624 the collaborative robot control system 112 determines whether the welding program is complete. For example, the operator may indicate via a user interface that the welding program is finished and/or the welding instructions should be generated (if not done in real-time as the teaching is occurring).

If the welding program is not complete (block 624), control returns to block 602 to continue teaching.

If the welding program is complete (block 624), at block 626 the collaborative robot control system 112 generates the collaborative robot instructions based on the robotic welding program. For example, the collaborative robot control system 112 may convert the program points to assembly instructions or other computer code, commands, kinematic solutions, and/or other data used to implement the robotic welding program. The example instructions 600 may then end, and return control to block 504 of FIG. 5.

In some examples, block 626 is performed during the creation of movement points and/or commands (e.g., blocks 602-622) rather than as a batch when the welding program is performed.

FIGS. 7A and 7B illustrate a flowchart representative of example machine readable instructions 700 which may be executed by the example collaborative robot control system (e.g., the teaching system 102), the example non-collaborative robot control system (e.g., the production welding system 150), and/or the external computing system 170 of FIG. 1 to convert a robotic welding program to weld the type of part from collaborative robot instructions to non-collaborative robot instructions. The example instructions 700 are disclosed below with reference to the collaborative robot control system 112, but may be performed by the non-collaborative robot control system 162 and/or by the external computing system 170. The example instructions 700 may be performed following selection of a type of the production welding system 150, and/or input and/or retrieval of characteristics of the production welding system 150.

At block 702, the collaborative robot control system 112 determines a transform between a collaborative robot frame of reference 420 and the non-collaborative robot frame of reference 422. For example, the collaborative robot control system 112 may determine a conversion of location information based on differences in the frames of reference 420, 422.

At block 704, the collaborative robot control system 112 determines a working envelope for the welding program (e.g., the working envelope 424 of FIG. 4) based on the instructions for the teaching system 102.

At block 706, the collaborative robot control system 112 transforms the working envelope to the frame of reference 422 of the non-collaborative robotic manipulator 156. For example, the collaborative robot control system 112 may use the transform determined in block 702 to determine the bounds of the welding program working envelope 424 within the frame of reference 422 of the non-collaborative robotic manipulator 156.

At block 708, the collaborative robot control system 112 determines whether the working envelope 424 of the welding program fits within the working envelope 418 of the non-collaborative robot. For example, the collaborative robot control system 112 may compare the working envelope 424 to the working envelope 418 of the non-collaborative robotic welding system to identify any overlap. If the welding program does not fit within the transformed working envelope 424 (block 708), at block 710 the collaborative robot control system 112 translates the transformation between the collaborative robot frame of reference 420 and the non-collaborative robot frame of reference 422 to fit the welding program within the working envelope 418 of the non-collaborative robot. For example, the collaborative robot control system 112 may adjust the transformation or shift the transformed working envelope 424 to fit within the working envelope 418 of the non-collaborative robot by applying a translational factor. Such a shift may involve a change in position of the table 154, a change in position of fixturing on the table 154, and/or other changes to the positioning of the workpiece 114 and/or the base 166 to adjust the working envelope 424 within the working envelope 418 of the non-collaborative robot. Control then returns to block 708 to reevaluate the working envelope 424.

Turning to FIG. 7B, when the welding program fits within the working envelope 418 of the non-collaborative robot (block 708), at block 712 the collaborative robot control system 112 selects first positioning information in the welding program. For example, the collaborative robot control system 112 may select a specified robotic position, or a set of two or more specified robot positions, associated with welding or non-welding movement based on the sequence of instructions in the welding program.

At block 714, the collaborative robot control system 112 converts the collaborative robot kinematic solution to a non-collaborative robot kinematic solution based on the transform (original as determined in block 702 or as adjusted in block 710) for the selected positioning information. The conversion may be further based on previous position information and/or subsequent position information.

At block 716, the collaborative robot control system 112 determines whether any singularities are detected in the non-collaborative robot kinematic solution. For example, the collaborative robot control system 112 may determine whether there is any interference with the workpiece 114, interference between joints in the robotic manipulator 156, and/or any other problems with the kinematic solution.

If singularities are detected (block 716), at block 718 the collaborative robot control system 112 modifies the non-collaborative robot kinematic solution to avoid the detected singularities. For example, the collaborative robot control system 112 may adjust one or more elements of the path of the collaborative robot control system 112 and/or re-calculate the kinematic solution using a different technique. Control then returns to block 716 to detect whether the same and/or different singularities are present with the modified kinematic solution.

When no singularities are detected in the kinematic solution (block 716), at block 720 the collaborative robot control system 112 determines whether there is additional positioning information in the welding program to be converted. If there is additional positioning information (block 720), at block 722 the collaborative robot control system 112 selects the next positioning information and returns control to block 714 to convert the kinematic solution for the selected positioning information.

When there is no additional positioning information to be converted (block 720), at block 724 the collaborative robot control system 112 converts welding commands and the non-collaborative kinematic solutions to a syntax used by the non-collaborative robot control system 162.

At block 726, the collaborative robot control system 112 generates instructions to be performed by the non-collaborative type of robot to perform the welding program based on the converted syntax. For example, the collaborative robot control system 112 may compile the converted instructions, commands, and/or other data into a welding program capable of being directly executed by the non-collaborative robot control system 162. The example instructions 700 then end, and return control to block 506 of FIG. 5.

Figure 8:
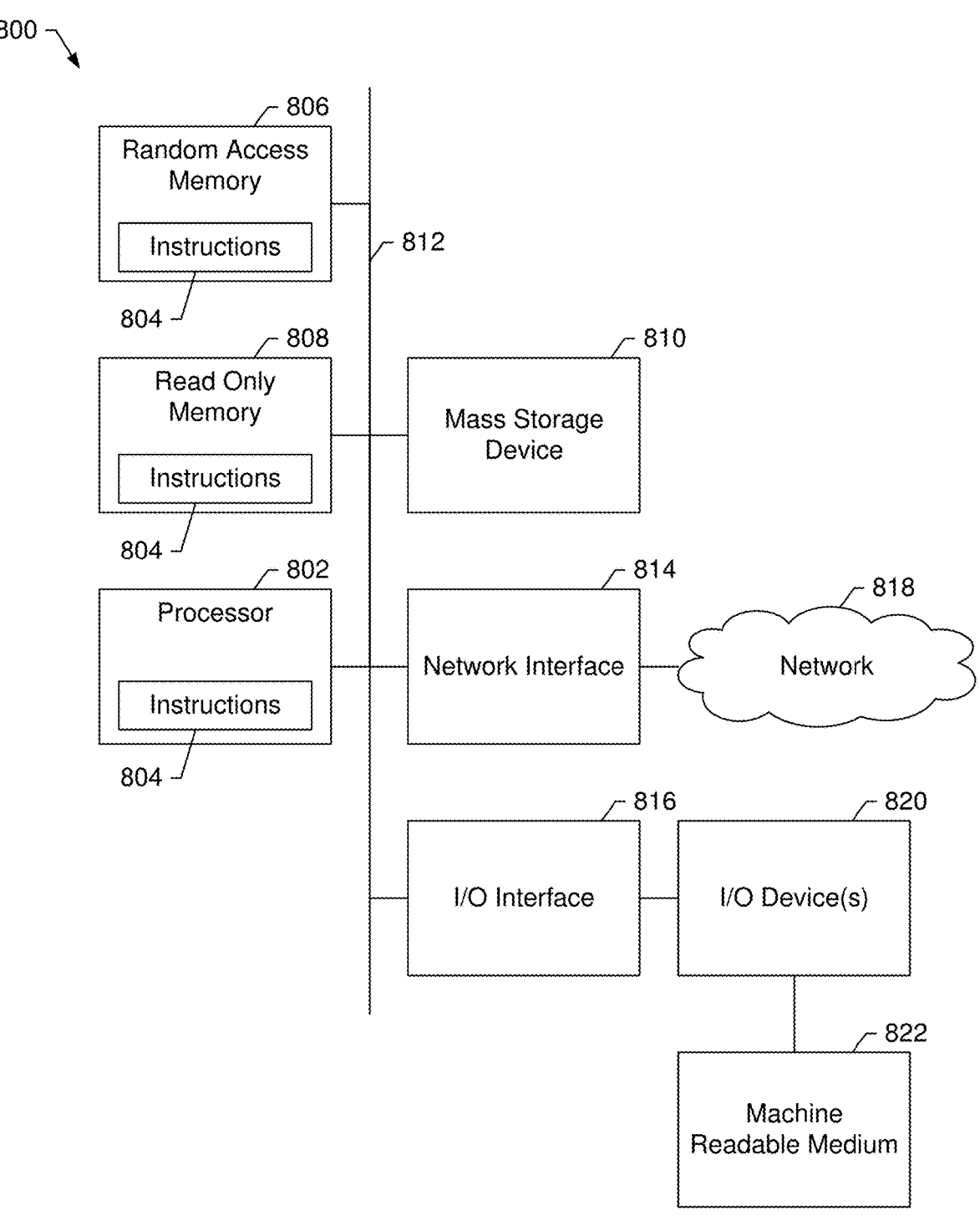
FIG. 8 is a block diagram of an example computing device which may be used to implement the external computing device of FIG. 1.

FIG. 8 is a block diagram of an example computing device 800 which may be used to implement the external computing device 170 of FIG. 1. The example computing device 800 of FIG. 8 may be a general-purpose computer, a laptop computer, a tablet computer, a mobile device, a server, and/or any other type of computing device. In some examples, the computing device 800 may be implemented in a cloud computing environment using one or more physical machines and, in some examples, one or more virtual machines in the data center.

The example computing device 800 of FIG. 8 includes a processor 802. The example processor 802 may be any general purpose central processing unit (CPU) from any manufacturer. In some other examples, the processor 802 may include one or more specialized processing units, such as graphic processing units and/or digital signal processors. The processor 802 executes machine readable instructions 804 that may be stored locally at the processor (e.g., in an included cache), in a random access memory 806 (or other volatile memory), in a read only memory 808 (or other non-volatile memory such as FLASH memory), and/or in a mass storage device 810. The example mass storage device 810 may be a hard drive, a solid state storage drive, a hybrid drive, a RAID array, and/or any other mass data storage device.

A bus 812 enables communications between the processor 802, the RAM 806, the ROM 808, the mass storage device 810, a network interface 814, and/or an input/output interface 816.

The example network interface 814 includes hardware, firmware, and/or software to connect the computing device 800 to a communications network 818 such as the Internet. For example, the network interface 814 may include IEEE 802.X-compliant wireless and/or wired communications hardware for transmitting and/or receiving communications.

The example I/O interface 816 of FIG. 8 includes hardware, firmware, and/or software to connect one or more input/output devices 820 to the processor 802 for providing input to the processor 802 and/or providing output from the processor 802. For example, the I/O interface 816 may include a graphics processing unit for interfacing with a display device, a universal serial bus port for interfacing with one or more USB-compliant devices, a FireWire, a field bus, and/or any other type of interface. Example I/O device (s) 820 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example computing device 800 may access a non-transitory machine readable medium 822 via the I/O interface 816 and/or the I/O device(s) 820. Examples of the machine readable medium 822 of FIG. 8 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power source with a program or other code that, when being loaded and executed, controls the welding power source such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A method to generate a robotic welding program, the method comprising:

generating a robotic welding program to weld a part using a collaborative robot welding system by manually manipulating the collaborative robot welding system to generate commands and robotic positioning information;

automatically converting, using a processor, a first plurality of instructions of the robotic welding program for execution on the collaborative robot welding system to a second plurality of instructions to execute the robotic welding program on a non-collaborative type of robotic welding system; and performing the robotic welding program using the non-collaborative type of robotic welding system to weld the part using the second plurality of instructions.

2. The method as defined in claim 1, wherein the converting comprises modifying at least one of a frame of reference of the first plurality of instructions or a relative location of a fixture in the frame of reference.

3. The method as defined in claim 2, wherein the modifying of the frame of reference or the relative location comprises translating the frame of reference using at least three sets of teach points, each set of teach points comprising a first teach point in the frame of reference and a second corresponding teach point in a second frame of reference of the second type of robotic welding system.

4. The method as defined in claim 1, wherein the converting comprises converting a first kinematic solution for the collaborative robot welding system to perform movements represented in the robotic welding program to a second kinematic solution for the non-collaborative type of robotic welding system to perform the movements.

5. The method as defined in claim 4, wherein converting the first kinematic solution to the second kinematic solution comprises determining an equivalent kinematic solution to the first kinematic solution, based on a different set of manipulator joints and manipulator links on the non-collaborative type of robot than on the collaborative robot.

6. The method as defined in claim 4, wherein converting the first kinematic solution to the second kinematic solution comprises identifying singularities in the non-collaborative type of robotic welding system based on the first kinematic solution, and configuring the second kinematic solution based on the identified singularity.

7. The method as defined in claim 1, wherein the generating of the robotic welding program using the collaborative robot welding system comprises using at least one of lead-through teaching or joystick-based teaching using a joystick positioned on a robotic manipulator of the collaborative robot welding system.

8. The method as defined in claim 1, wherein the converting comprises increasing a speed of execution of the robotic welding program from the collaborative robot welding system to the second type of robotic welding system.

9. The method as defined in claim 1, wherein the converting comprises:

executing a first program to convert the first plurality of instructions to an intermediate set of instructions; and executing a second program to convert the intermediate set of instructions to the second plurality of instructions.

10. The method as defined in claim 1, wherein converting the first plurality of instructions comprises converting the robotic positioning information based on sizes of manipulator links of the collaborative robot welding system and sizes of manipulator links of the non-collaborative robot welding system.

11. The method as defined in claim 1, wherein the first plurality of instructions comprise a different programming syntax than the second plurality of instructions.

12. The method as defined in claim 1, wherein converting the first plurality of instructions of the robotic welding program comprises transferring the robotic welding program to an external computing system comprising the processor.

13. The method as defined in claim 1, further comprising performing the robotic welding program on the second type of robotic welding system using the second plurality of instructions simultaneously with generating a second robotic welding program using the collaborative robot welding system.

14. The method as defined in claim 1, wherein converting the first plurality of instructions comprises:

determining, with the processor, a working envelope of the non-collaborative robot; and determining, with the processor, whether the robotic welding program fits within the working envelope of the non-collaborative robot.

* * * * *